(12) United States Patent
Nishida et al.

(10) Patent No.: US 11,264,927 B2
(45) Date of Patent: Mar. 1, 2022

(54) ELECTRIC VEHICLE PROPULSION CONTROL DEVICE

(71) Applicant: Mitsubishi Electric Corporation, Tokyo (JP)

(72) Inventors: Shota Nishida, Tokyo (JP); Sho Kato, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 53 days.

(21) Appl. No.: 16/478,659

(22) PCT Filed: Mar. 10, 2017

(86) PCT No.: PCT/JP2017/009779
§ 371 (c)(1),
(2) Date: Jul. 17, 2019

(87) PCT Pub. No.: WO2018/163420
PCT Pub. Date: Sep. 13, 2018

(65) Prior Publication Data
US 2019/0386597 A1    Dec. 19, 2019

(51) Int. Cl.
*H02P 23/00*   (2016.01)
*H02P 21/09*   (2016.01)
(Continued)

(52) U.S. Cl.
CPC .............. *H02P 21/09* (2016.02); *H02P 21/18* (2016.02); *H02P 21/22* (2016.02); *B60L 9/18* (2013.01);
(Continued)

(58) Field of Classification Search
CPC .... B60L 2210/40; B60L 9/18; B60Y 2200/91; B60Y 2400/604; B60Y 2400/61; H02P 21/09; H02P 21/18; H02P 21/22
(Continued)

(56) References Cited

U.S. PATENT DOCUMENTS 8,314,579 B2 * 11/2012 Nishimura .............. H02P 21/18
                                                    318/400.32
9,762,165 B2    9/2017 Yamashita et al.
(Continued)

FOREIGN PATENT DOCUMENTS

JP    2002374699 A    12/2002
WO   2014024285 A1    2/2014

OTHER PUBLICATIONS

International Search Report (PCT/ISA/210) dated Jun. 6, 2017, by the Japan Patent Office as the International Searching Authority for International Application No. PCT/JP2017/009779.

*Primary Examiner* — Kawing Chan
*Assistant Examiner* — Gabriel Agared
(74) *Attorney, Agent, or Firm* — Buchanan Ingersoll & Rooney PC

(57) ABSTRACT

An electric vehicle propulsion control device includes a power converter that applies an alternating-current voltage to an induction machine and a controller that controls the power converter based on an external operation command. The controller includes a first calculation unit. The first calculation unit calculates, from current information (id and iq) detected at the induction machine and current command values (id*1 and iq*1) that are based on the operation command, a d-axis voltage command (Vd*1) and a q-axis voltage command (Vq*1) for the power converter, and a primary magnetic flux φds and a secondary magnetic flux φdr of the induction machine. The first calculation unit also adds to or subtracts from a term including the q-axis voltage command (Vq*1) an interference term stemming from the d-axis voltage command (Vd*1) in calculating a first speed ω1 that is a free-run speed of the induction machine.

9 Claims, 9 Drawing Sheets

(51) Int. Cl.
*H02P 21/18* (2016.01)
*H02P 21/22* (2016.01)
*B60L 9/18* (2006.01)

(52) U.S. Cl.
CPC ....... *B60L 2210/40* (2013.01); *B60Y 2200/91* (2013.01); *B60Y 2400/604* (2013.01); *B60Y 2400/61* (2013.01)

(58) Field of Classification Search
USPC .......................................................... 318/766
See application file for complete search history.

(56) References Cited

U.S. PATENT DOCUMENTS

| | | | | |
|---|---|---|---|---|
| 2008/0048607 | A1* | 2/2008 | Kono | ..................... H02P 21/12 318/802 |
| 2012/0001587 | A1* | 1/2012 | Kono | ..................... H02P 21/26 318/801 |
| 2012/0209467 | A1* | 8/2012 | Kono | ..................... H02P 21/16 701/22 |
| 2012/0268046 | A1* | 10/2012 | Yamazaki | ............... H02P 21/26 318/400.02 |

* cited by examiner

ELECTRIC VEHICLE PROPULSION CONTROL DEVICE

FIELD

The present invention relates to an electric vehicle propulsion control device that drives a traction motor mounted to an electric vehicle without using a speed detector, namely, through so-called speed-sensorless control and, more particularly, to an electric vehicle propulsion control device that restarts a traction motor in a free-run state.

BACKGROUND

To restart a traction motor that is in a free-run state with alternating-current power supply being interrupted, a frequency, a phase, and an amplitude of an output voltage that a power converter of an electric vehicle propulsion control device applies need to respectively coincide with a rotational frequency, a residual voltage phase, and an amplitude of the traction motor in the free-run state. A voltage phase difference and an amplitude difference cause a large current to flow through the power converter, and a frequency difference causes sudden torque to the traction motor.

As a means to solve such a problem, a conventional technique described in Patent Literature 1 below reduces instability that is caused when a traction motor in the free-run state is restarted and is such as follows. Between an induction motor model unit that calculates magnetic flux estimation values and a motor current estimation unit that receives the magnetic flux estimation values as inputs from the induction motor model unit and calculates current estimation values, a magnetic flux estimation value correction unit is provided to correct rise of the magnetic flux estimation value when an electric vehicle is in a process of shifting from coasting to restart.

CITATION LIST

Patent Literature

Patent Literature 1: Japanese Patent Application Laid-open No. 2002-374699

SUMMARY

Technical Problems

Vehicle speed estimation plays a role of paramount importance in speed-sensorless control for an electric vehicle. However, speed information cannot be obtained in the speed-sensorless control when a power converter stops its operation. For this reason, a so-called f search that estimates an initial speed must be carried out for restart after the operation of the power converter stops temporarily. The initial speed mentioned here is an initial vehicle speed value that is necessary for transition to estimation of a steady speed. The f search is required to accurately estimate the vehicle speed in a short time for smooth transition to the steady speed estimation. As such, high-response initial speed estimation using a simple formula is an essential requirement.

However, f search techniques are still developing and are required to improve further. In an area of electric vehicle control, a control frequency ranges widely from 0 to 200 Hz and coupled with such a condition characteristic of the electric vehicle that an overhead wire voltage varies widely from 900 to 1800 V, can cause no achievement of stable vehicle speed estimation.

Also confirmed is such an event that with emergence of highly efficient induction motors in recent years, stable speed estimation cannot be achieved by the f search. Two particular causes of such an event are named as follows.

The first one is a circuit constant change resulting from improved efficiency of the induction motor. The improved efficiency of the induction motor causes a secondary circuit time constant L2/R2 to be a relatively large ratio of secondary inductance L2 to secondary resistance R2. Accordingly, a secondary-side magnetic flux is hard to excite compared to a conventional induction motor. The second one is a control method of a current f search. In the current f search, speed estimation is carried out using a simple formula by simplifying a secondary-side influence of the induction motor. As such, the current f search is susceptible to dead time, an ON voltage output error, or a primary resistance error. Thus, the f search cannot achieve stable speed estimation when a desired secondary-side magnetic flux is not excited. What can be said from the above technical backgrounds is that improvement of stability of the initial speed estimation is a technical challenge in the speed-sensorless control for the electric vehicle.

The present invention has been made in view of the above, and an object of the present invention is to obtain an electric vehicle propulsion control device that enables improved stability of estimation of an initial speed in speed-sensorless control for an electric vehicle.

Solution to Problems

To solve the above-stated problems and to achieve the object, an electric vehicle propulsion control device according to the present invention includes a power converter that applies an alternating-current voltage to an induction machine mounted to an electric vehicle, and a controller that controls the power converter based on an external operation command. The controller includes a first calculation unit and a second calculation unit. The first calculation unit calculates, from current information detected at the induction machine and current command values that are based on the operation command, a d-axis voltage command and a q-axis voltage command for the power converter, and a primary magnetic flux and a secondary magnetic flux of the induction machine. The first calculation unit also adds to or subtracts from a term including the q-axis voltage command an interference term stemming from the d-axis voltage command in calculating a first speed that is a free-run speed of the induction machine. The second calculation unit uses, as initial values, the first speed and the induction machine's magnetic fluxes that are output from the first calculation unit, and calculates second voltage command values for the power converter, and a second speed that is a driving speed of the induction machine.

Advantageous Effect of Invention

The present invention enables improved stability of estimation of the initial speed in speed-sensorless control for the electric vehicle.

DESCRIPTION OF EMBODIMENT

With reference to the drawings, a detailed description is hereinafter provided of an electric vehicle propulsion control device according to an embodiment of the present invention. It is to be noted that the following embodiment is not restrictive of the present invention.

Embodiment

Figure 1:
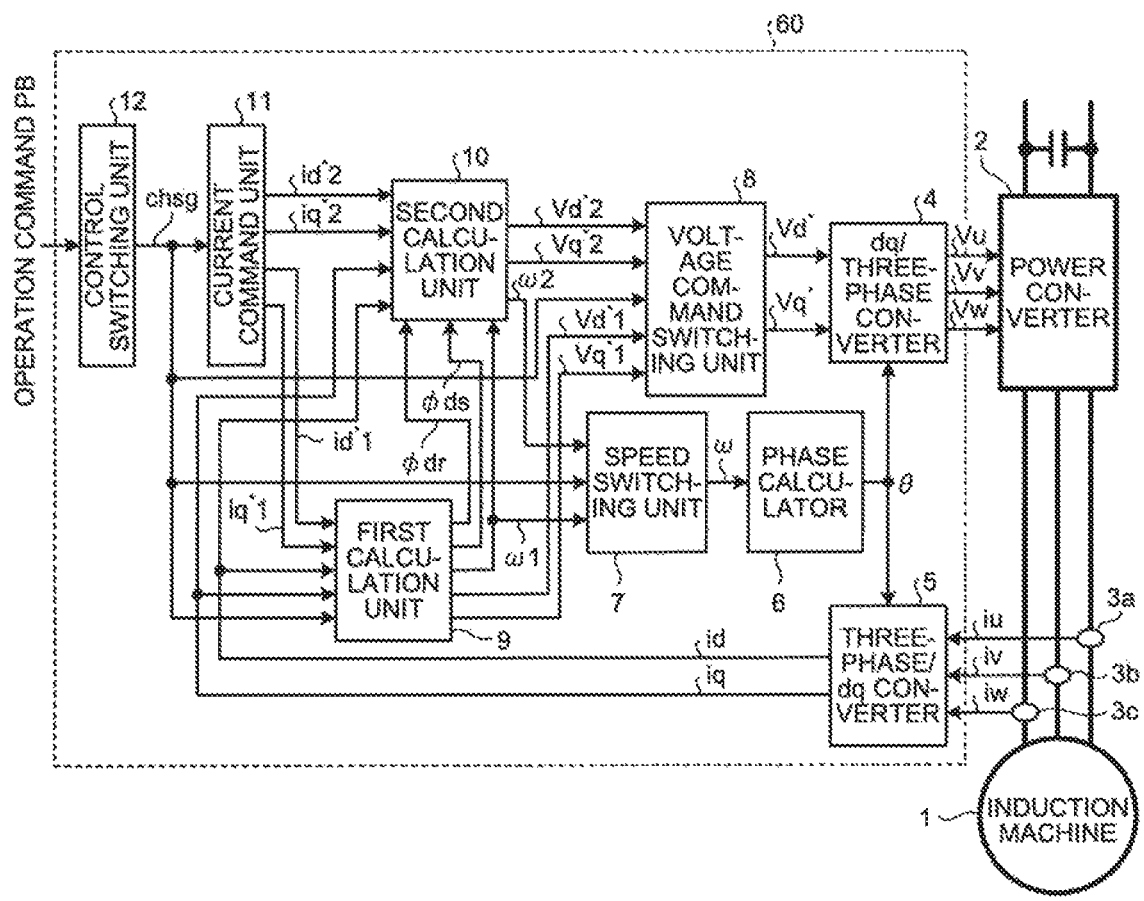
FIG. 1 is a block diagram illustrating a configuration example of an electric vehicle propulsion control device according to the present embodiment.

FIG. 1 is a block diagram illustrating a configuration example of an electric vehicle propulsion control device 100 according to a first embodiment. In FIG. 1, the electric vehicle propulsion control device 100 includes a power converter 2 that converts a direct-current voltage to an alternating-current voltage for application to an induction machine 1, and a controller 60 that controls the power converter 2 based on an external operation command PB. The controller 60 includes a control switching unit 12, a current command unit 11, a first calculation unit 9, a second calculation unit 10, a speed switching unit 7, a voltage command switching unit 8, a phase calculator 6, a dq/three-phase converter 4, and a three-phase/dq converter 5.

The induction machine 1 is a traction motor mounted to the electric vehicle. The induction machine 1 is connected to the power converter 2. The power converter 2 applies the three-phase voltage having a frequency of choice to the induction machine 1. Current detectors 3a, 3b, and 3c respectively detect phase currents iu, iv, and iw that flow at respective phases of the induction machine 1. Respective values of the detected phase currents iu, iv, and iw become current information detected at the induction machine 1. The current detectors 3a, 3b, and 3c are, for example, current transformers (CTs). It is to be noted that the phase currents may be detected by other publicly known units or methods instead of the CTs. While every one of the three phases has the CT disposed in FIG. 1, the CT for one of the phases can be omitted by use of a relation, iu+iv+iw=0, that is a three-phase equilibrium condition. The respective values of the phase currents iu, iv, and iw detected by the current detectors 3a, 3b, and 3c are given to the three-phase/dq converter 5.

The three-phase/dq converter 5 converts the respective values of the detected phase currents iu, iv, and iw of a three-phase coordinate system into a d-axis current id and a q-axis current iq that are current values of a dq coordinate system. It is to be noted that information on a phase angle of a control coordinate axis is required for coordinate transformation. If the phase of the control coordinate axis is θ here, this phase θ can be obtained when an angular frequency ω that is an output of the speed switching unit 7 (described later) is integrated. In the present embodiment, this is achieved by the phase calculator 6 as illustrated in the drawing. The d-axis and q-axis currents id and iq generated by the three-phase/dq converter 5 are output to the first calculation unit 9 and the second calculation unit 10.

The operation command PB is input from a motorman's cab (not illustrated) to the control switching unit 12 of the controller 60. The operation command PB conceptually includes both a powering command P that is a notch command indicative of acceleration, and a brake command B that is a notch command indicative of braking. Upon receiving the operation command PB as the input, the control switching unit 12 generates a control mode signal chsg.

The control mode signal chsg output from the control switching unit 12 includes a control mode 1 signal that is a first control signal, and a control mode 2 signal that is a second control signal. Specifically, upon receiving the operation command PB as the input, the control switching unit 12 first outputs the control mode 1 signal and after a lapse of a predetermined first time period, subsequently outputs the control mode 2 signal. The control mode 1 signal functions as a trigger for initiation of induction machine 1 speed estimation, while the control mode 2 signal is intended for switching between controls, replacing the control mode 1 signal.

Taking into consideration an operation time characteristic of the first calculation unit 9, the first time period mentioned above is set as a time period that is necessary and sufficient for accurate calculation of a first speed that is a free-run speed of the induction machine 1. It is to be noted that the free-run speed is synonymous with an angular frequency of a voltage induced in the induction machine 1 in a free-run state, although a unit representing its physical quantity is different. The first speed, which is the free-run speed, is hereinafter referred to as "first angular frequency", and this first angular frequency is represented by "ω1".

In the present embodiment, the time period for the control mode 1 signal that follows the input of the operation command PB is shorter than 0.15 seconds. An effect that can be obtained from this is no concern about delay in acceleration or deceleration operation of the power converter 2 and the induction machine 1 that follows the motorman's input of the operation command PB. If the time period for the control mode 1 signal is longer, the power converter 2 and the induction machine 1 do not readily accelerate even after the powering command P is input, so that the motorman would have a feeling of wrongness. The short time period for the control mode 1 signal can eliminate this motorman's feeling of wrongness.

The control mode signal chsg output from the control switching unit 12 is input to the current command unit 11, the voltage command switching unit 8, the speed switching unit 7, and the first calculation unit 9. The current command unit 11 generates, for output in synchronization with the control mode 1 signal, a d-axis current command id*1 and a q-axis current command iq*1 that are respectively a magnetic-flux-axis current command value and a torque-axis current command value and correspond to the induction machine 1. The current command unit 11 also generates, for output in synchronization with the control mode 2 signal, a magnetic-flux-axis current command id*2 and a torque-axis current command iq*2.

Figure 2:
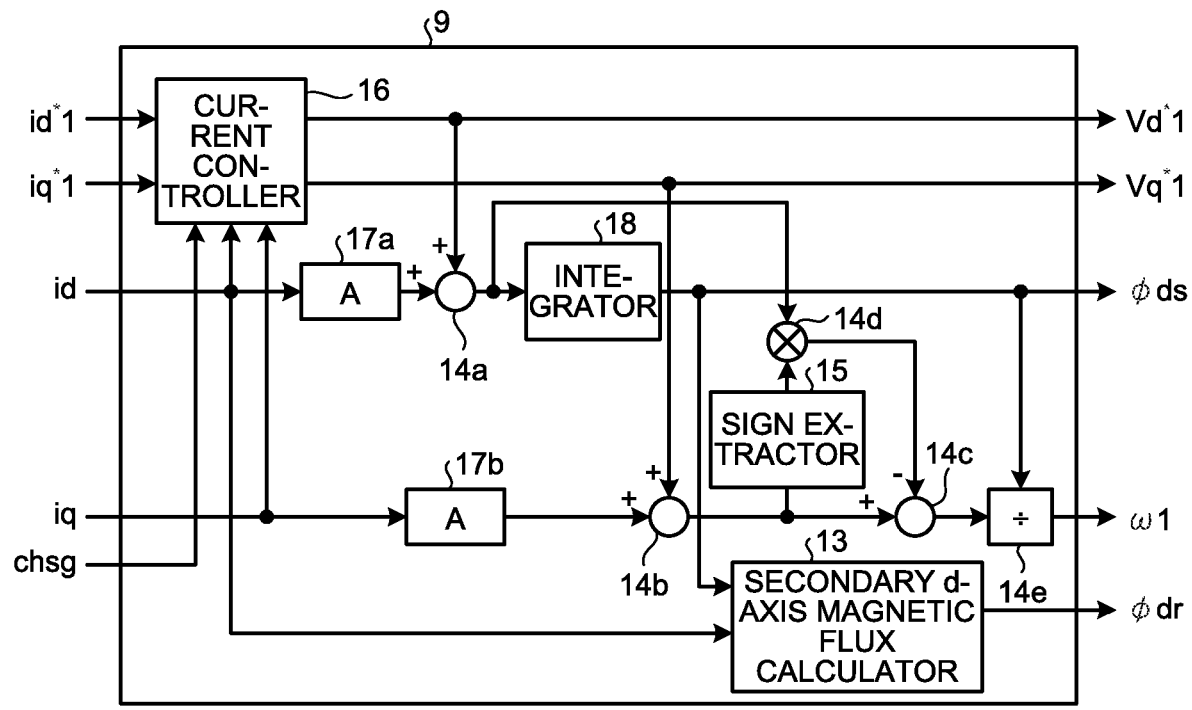
FIG. 2 is a block diagram illustrating a configuration of a first calculation unit according to the present embodiment.

A description is provided next of a configuration and functions of the first calculation unit 9. FIG. 2 is a block diagram illustrating the configuration of the first calculation unit 9. The first calculation unit 9 mainly includes a current controller 16, a secondary d-axis magnetic flux calculator 13, adders 14a and 14b, a subtracter 14c, a divider 14e, a sign extractor 15, gain application units 17a and 17b, and an integrator 18.

Based on the d-axis current command id*1, the q-axis current command iq*1, the d-axis current id, which is a d-axis current detection value, the q-axis current iq, which is a q-axis current detection value, and the control mode signal chsg, the first calculation unit 9 calculates first voltage command values that are a d-axis voltage command Vd*1 and a q-axis voltage command Vq*1 and also calculates the first angular frequency ω1 in the free-run state, a primary d-axis magnetic flux φds, and a secondary d-axis magnetic flux φdr.

The first calculation unit 9 is similar to that of prior invention described in Japanese Patent No. 4459301 (hereinafter simply referred to as "prior invention") in that the d-axis current command id*1, the q-axis current command iq*1, the d-axis current id, the q-axis current iq, and the control mode signal chsg are used as input signals, while the d-axis voltage command Vd*1, the q-axis voltage command Vq*1, the first angular frequency ω1, the primary d-axis magnetic flux Os, and the secondary d-axis magnetic flux φdr are output as output signals. However, the prior invention is based on the assumption that there is no rotor-side residual magnetic flux, whereas the present invention takes into consideration a rotor-side residual magnetic flux. In other words, the present invention clearly differs from the prior invention in that the rotor-side residual magnetic flux is taken into account. The following description of the present invention focuses on differences from the prior invention.

In an f search according to the prior invention, a formula is developed with a secondary current eliminated from a state equation of an induction machine, and the following two formulas are derived for determination of a first angular frequency ω1, which is a speed estimation value, with a primary magnetic flux vector aligned along a d axis that is one of rotating two axes including the d axis and a q axis.

[Formula 1]

$$\phi ds = \frac{1}{S}(Vds - Rs \times ids) \tag{1}$$
$$\omega = \frac{(Vqs - Rs \times iqs)}{\phi ds}$$

In Formulas (1), φds is an estimated primary magnetic flux, Rs is a primary resistance, S is a Laplace operator, Vds is a d-axis induced voltage, Vqs is a q-axis induced voltage, ids is a d-axis primary current, and iqs is a q-axis primary current. The Laplace operator is also called "differential operator".

A secondary magnetic flux φ does not appear in Formulas (1). In other words, Formulas (1) do not take into consideration the secondary magnetic flux φ. Next, a theoretical formula that takes into consideration the secondary magnetic flux φ is derived.

In the presence of the secondary magnetic flux φ, a state equation of the induction machine can be expressed as follows:

[Formula 2]

$$S\sigma Ls \begin{pmatrix} id \\ iq \\ \phi \end{pmatrix} = \begin{pmatrix} A & \omega \sigma Ls & \frac{MRr}{Lr^2} \\ -\omega \sigma Ls & A & -\omega \frac{M}{Lr} \\ \frac{\sigma LsMRr}{Lr} & 0 & -\frac{\sigma LsRr}{Lr} \end{pmatrix} \begin{pmatrix} id \\ iq \\ \phi \end{pmatrix} + \begin{pmatrix} Vd \\ Vq \\ 0 \end{pmatrix} \tag{2}$$

It is to be noted that Formula (2) is assumed to be under no-load conditions and is used for calculation under such a condition that slip frequency ωs=0, that is, ω=ωr. In Formula (2), id is the d-axis current, iq is the q-axis current, Ls is primary inductance, Lr is secondary inductance, M is mutual inductance, ω is the angular frequency, Rr is secondary resistance, σ is a leakage coefficient, and A is a multiplier coefficient. The leakage coefficient σ can be expressed by σ=1−M²/(Ls·Lr). The multiplier coefficient A can be expressed by the following formula:

[Formula 3]

$$A = -Rs - \frac{M^2}{Lr^2}Rr \tag{3}$$

Derived from the first-row coefficient of a matrix of Formula (2) is the following formula:

[Formula 4]

$$Vd + Aid = S\sigma Lsid - \omega \sigma Lsiq - \frac{MRr}{Lr^2}\phi \tag{4}$$

When both sides of Formula (4) are integrated, the following formula is obtained.

[Formula 5]

$$\frac{1}{S}(Vd + Aid) = \sigma Lsid - \frac{1}{S}\omega \sigma Lsiq - \frac{1}{S}\frac{MRr}{Lr^2}\phi \tag{5}$$

Derived from the second-row coefficient of the matrix of Formula (2) is the following formula:

[Formula 6]

$$Vq + Aiq = \omega\left(\frac{1}{\omega}S\sigma Lsiq + \sigma Lsid + \frac{M}{Lr}\phi\right) \quad (6)$$

When both sides of a formula derived from the third-row coefficient of the matrix of Formula (2) are integrated, the following formula is derived.

[Formula 7]

$$\frac{M}{Lr}\phi - \frac{1}{S}\frac{M^2 Rr}{Lr^2}id = -\frac{1}{S}\frac{MRr}{Lr^2}\phi \quad (7)$$

When Formula (7) is substituted into Formula (4), obtained is the following formula:

[Formula 8]

$$\frac{1}{S}(Vd + Aid) = \sigma Lsid + \sigma Ls\left(-\frac{1}{S}\omega iq\right) + \left(\frac{M}{Lr}\phi - \frac{1}{S}\frac{M^2 Rr}{Lr^2}id\right) \quad (8)$$

When Formula (4) is subtracted from Formula (6), the following formula can be developed.

[Formula 9]

$$Vq + Aiq - (Vd + Aid) = \quad (9)$$
$$\omega\left(\frac{1}{\omega}S\sigma Lsiq + \sigma Lsid + \frac{M}{Lr}\phi\right) - \omega\left(\frac{1}{\omega}S\sigma Lsid - \sigma Lsiq - \frac{1}{\omega}\frac{MRr}{Lr^2}\phi\right) =$$
$$\omega\left\{\sigma Lisd + \sigma Ls\left(\frac{1}{\omega}Siq - \frac{1}{\omega}Sid + iq\right) + \left(\frac{M}{Lr}\phi + \frac{1}{\omega}\frac{MRr}{Lr^2}\phi\right)\right\}$$

Provided here is a demonstration that a right-hand side of Formula (8) is equal to the one inside braces of a right-hand side of Formula (9). Assuming that there is an axial deviation of $\theta = \omega t$ between the control axis and an actual rotating axis, relations respectively defined by the following formulas hold first.

[Formulas 10]

$$Id' = Id \cos \omega t + Iq \sin \omega t$$

$$Iq' = -Id \sin \omega t + Iq \cos \omega t \quad (10)$$

In Formulas (10), Id and Iq are respectively a d-axis current and a q-axis current of the d and q axes when a direction of the secondary magnetic flux of a rotor of the induction machine is aligned along the d axis, and Id' and Iq' are respectively a d-axis current and a q-axis current of the control axes.

Transformation into the following formula can be achieved when with the control-axis iq in a second term of the right-hand side of Formula (8) being iq=Iq', a right-hand-side formula for Iq' expressed by a second formula of Formulas (10) is substituted.

[Formula 11]

$$\left(-\frac{1}{S}\omega iq\right) = \quad (11)$$
$$-\omega\left\{\frac{1}{S}(-Id\sin\omega t + Iq\cos\omega t)\right\} = -\omega\left\{\frac{1}{\omega}Id\cos\omega t + \frac{1}{\omega}Iq\sin\omega t\right\} = -Id'$$

Transformation into the following formula can be achieved when with the control-axis id and iq that are inside parentheses of a second term inside the right-hand-side braces of Formula (9) being respectively id=Id' and iq=Iq', a right-hand-side formula for Id' expressed by a first formula of Formulas (10) and the right-hand-side formula for Iq' expressed by the second formula of Formulas (10) are substituted.

[Formula 12]

$$\left(-\frac{1}{S}Siq - \frac{1}{\omega}Sid + iq\right) = \quad (12)$$
$$\frac{1}{\omega}S(-Id\sin\omega t + Iq\cos\omega t) - \frac{1}{\omega}S(Id\cos\omega t + Iq\sin\omega t) -$$
$$Id\sin\omega t + Iq\cos\omega t = \frac{1}{\omega}(-\omega Id\cos\omega t - \omega Iq\sin\omega t) -$$
$$\frac{1}{\omega}(-\omega Id\sin\omega t - \omega Iq\cos\omega t) - Id\sin\omega t + Iq\cos\omega t =$$
$$-Id\cos\omega t - Iq\sin\omega t - Iq\cos\omega t - Id\sin\omega t + Iq\cos\omega t = -Id'$$

As can be seen from Formulas (11) and (12), the second term of the right-hand side of Formula (8) is equal to the second term of the right-hand side of Formula (9).

Next, a second term inside parentheses of a third term of the right-hand side of Formula (8) can be transformed into the following formula when with the control-axis id of this second term inside the parentheses being id=Id', the right-hand side expressed for Id' in the first formula of Formulas (10) is substituted.

[Formula 13]

$$-\frac{1}{S}\frac{M^2 Rr}{Lr^2}id = -\frac{M^2 Rr}{Lr^2}\frac{1}{S}(Id\cos\omega t + Iq\sin\omega t) = \quad (13)$$
$$-\frac{M^2 Rr}{Lr^2}\left(\frac{1}{\omega}Id\sin\omega t - \frac{1}{\omega}Iq\cos\omega t\right) = \frac{1}{\omega}\frac{M^2 Rr}{Lr^2}Iq'$$

As such, if MIq'=φ, the third term of the right-hand side of Formula (8) becomes equal to a third term of the right-hand side of Formula (9). If a rotation direction is different, θ=−ωt, so that a relation, −MIq'=φ, results.

Assuming from the above that the right-hand side of Formula (8) is substantially equal to the one inside the braces of the right-hand side of Formula (9), the angular frequency ω, which is the estimated speed, can be summarized and calculated using Formula (14) below:

[Formula 14]

$$\omega = \frac{Vq + Aid \mp (Vd + Aid)}{\frac{1}{S}(Vd + Aid)} \quad (14)$$

The angular frequency ω expressed by Formula (14) is output to the second calculation unit 10, becoming an initial value the second calculation unit 10 uses for estimation of a steady speed.

A minus-plus sign prefixed to "Vd+Aid" in Formula (14) means that based on a result of calculation using Formula (7), an appropriate choice needs to be made in accordance with a sign of the angular frequency ω, that is to say, the rotation direction of the induction machine. However, the rotation direction is not clear in actual sensorless control, so that a signum function Sign of a q-axis voltage signal is used in the following formula for determination.

[Formula 15]

$$\omega = \frac{Vq + Aiq - (Vd + Aid) \cdot \text{Sign}(Vq + Aiq)}{\frac{1}{S}(Vd + Aid)} \quad (15)$$

As described above, the present invention's method that uses Formula (15) to take into consideration the rotor-side residual magnetic flux is such that a "Vd+Aid" value based on a sign of "Vq+Aiq" is added to the formula of the prior invention. It is to be noted here that "Vd+Aid" is an interference term as seen from "Vq+Aiq". As such, this "Vd+Aid" as seen from "Vq+Aiq" is referred to as a d-axis interference term.

In cases where a new f search according to the present invention is used, the primary magnetic flux Os and the secondary magnetic flux φdr need to be estimated to be applied as initial values to the second calculation unit 10 illustrated in FIG. 1.

The primary magnetic flux Os can be calculated using the following formula:

[Formula 16]

$$\phi ds = \frac{1}{S}(Vd + Aid) \quad (16)$$

For the secondary magnetic flux φdr, on the other hand, Formula (9) taking into consideration the residual magnetic flux is converted to the following formula first.

[Formula 17]

$$\frac{Vq + Aiq - (Vd + Aid)}{\hat{\omega}} = \sigma Lsid + \sigma Ls\left(\frac{1}{\omega}Siq - \frac{1}{\omega}Sid + iq\right) + \left(\frac{M}{Lr}\phi + \frac{1}{\omega}\frac{MRr}{Lr^2}\phi\right) \quad (17)$$

In Formula (17), a second term of a right-hand side is zero in a steady state. During rotation of the induction machine, inside parentheses of a third term of the right-hand side, a first item is far larger than a second term. In other words, between the first and second items inside those parentheses, there is a relation defined by the following formula:

[Formula 18]

$$\frac{M}{Lr}\phi \gg \frac{1}{\omega}\frac{MRr}{Lr^2}\phi \quad (18)$$

When the relation defined by Formula (18) is used, Formula (17) can be transformed into the following formula:

[Formula 19]

$$\phi dr = \frac{Lr}{M}\left\{\frac{Vq + Aiq - (Vd + Aid)}{\hat{\omega}} - \sigma Lsid\right\} = \frac{Lr}{M}\{\phi ds - \sigma Lsid\} \quad (19)$$

As such, using Formula (19), the secondary d-axis magnetic flux φdr is calculated as an estimated secondary magnetic flux.

A return is made to FIG. 2, and a description is provided of correspondences between the above formulas and the components of a control system illustrated in FIG. 2.

The first angular frequency ω1 can be estimated first using Formula (15) mentioned above. To calculate the first angular frequency ω1, in FIG. 2, the gain application unit 17b, the adder 14b, the subtracter 14c, a multiplier 14d, the divider 14e, and the sign extractor 15 are mounted. The q-axis current iq is converted into a q-axis-voltage physical quantity, for input to one plus terminal of the adder 14b, by the gain application unit 17b that applies to the q-axis current iq a gain corresponding to a value of A expressed by Formula (3). Input to another plus terminal of the adder 14b is the q-axis voltage command Vq*1 generated by the current controller 16. Input to a plus terminal of the subtracter 14c is a value obtained by addition of the q-axis voltage command Vq*1 and the q-axis current iq to which the gain corresponding to the value of A is applied.

The sign extractor 15 monitors the sign of the output of the gain application unit 17b. When the output of the gain application unit 17b has a plus sign, the multiplier 14d multiplies a d-axis voltage command Vd*1 by "1" for input to a minus terminal of the subtracter 14c. This means that when the output of the gain application unit 17b has the plus sign, the subtracter 14c calculates, for input to the divider 14e, a value of difference from the q-axis voltage command Vq*1 plus the q-axis current iq to which the gain corresponding to the value of A is applied.

On the other hand, when the output of the gain application unit 17b has a minus sign, the multiplier 14d multiplies the d-axis voltage command Vd*1 by "−1", and an output of the multiplier 14d is input to the minus terminal of the subtracter 14c. This means that when the output of the gain application unit 17b has the minus sign, the subtracter 14c calculates, for input to the divider 14e, a value that results from addition to the q-axis voltage command Vq*1 plus the q-axis current iq to which the gain corresponding to the value of A is applied.

The divider 14e divides the output of the subtracter 14c by the primary d-axis magnetic flux Os. In this way, the first angular frequency ω1, which is the speed estimation value, is calculated.

The gain applied by the FIG. 2 gain application unit 17b corresponds to the value of A expressed by Formula (3). The gain here is a part associated with responsiveness of the determination of the first angular frequency ω1. As disclosed in the prior invention, a gain corresponding to a value of the primary resistance Rs may be applied as a first gain.

As a second term of a numerator in Formula (14) or (15) expresses, adding or subtracting the d-axis interference component to or from the q-axis induced voltage is a key point. With this control system ensured, an effect that can be obtained is secured stability of estimation of the initial speed.

The secondary d-axis magnetic flux φdr that is the residual magnetic flux can be estimated using above-mentioned Formula (19). In FIG. 2, the secondary d-axis magnetic flux calculator 13 is mounted to calculate the secondary d-axis magnetic flux φdr and differs from that of the prior invention in that input signals include, in addition to the d-axis current id, the primary magnetic flux φds that is an estimated primary magnetic flux generated by the integrator 18.

The prior invention uses only the d-axis current id to estimate the secondary d-axis magnetic flux φdr, whereas the present invention uses the d-axis current id and the primary magnetic flux φds to estimate the secondary d-axis magnetic flux φdr and thus enables enhanced estimation accuracy of the secondary d-axis magnetic flux φdr. The secondary d-axis magnetic flux φdr is a term that contributes to torque response. As such, with the use of the primary magnetic flux φds in addition to the d-axis current id for estimation of the secondary d-axis magnetic flux φdr, an effect that can be obtained is enhanced stability with respect to the torque response.

Figure 3:
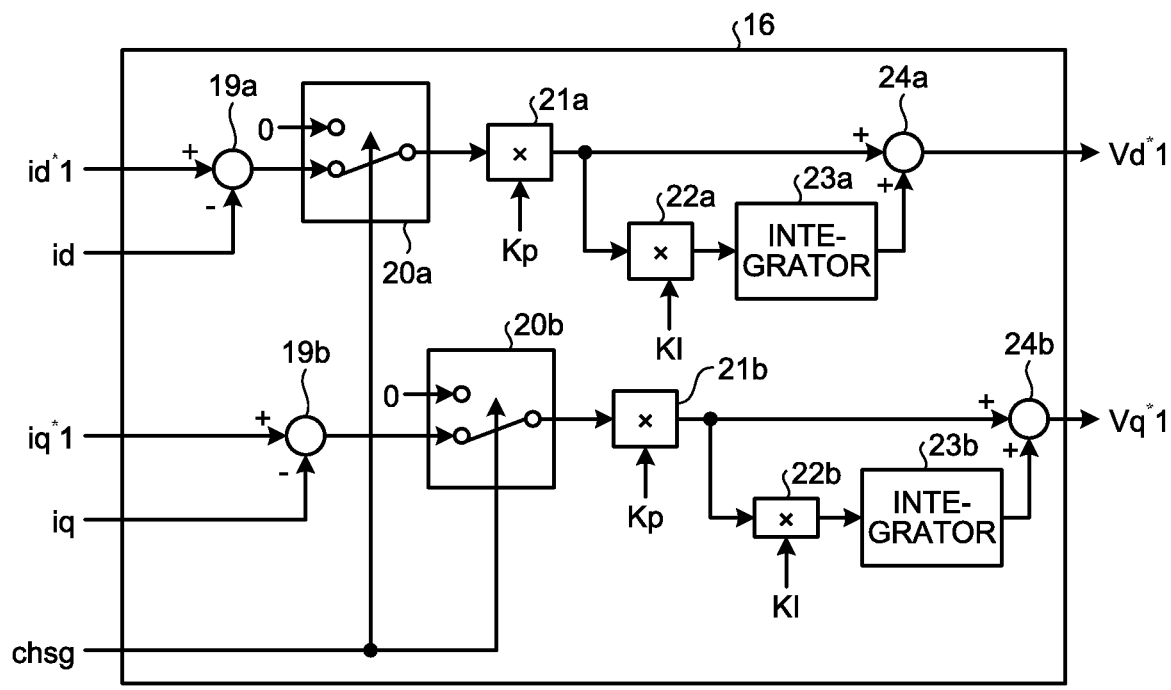
FIG. 3 is a block diagram illustrating a configuration example of a current controller illustrated in FIG. 2.

FIG. 3 is a block diagram illustrating a configuration example of the current controller 16 illustrated in FIG. 2. The current controller 16 receives the d-axis current command id*1, the q-axis current command iq*1, the d-axis current id, the q-axis current iq, and the control mode signal chsg as inputs and is the component that calculates the d-axis voltage command Vd*1 and the q-axis voltage command Vq*1. As illustrated in FIG. 3, the current controller 16 includes subtractors 19a and 19b, switching units 20a and 20b that are current switching units, multipliers 21a and 21b that each apply a current control proportional gain Kp, multipliers 22a and 22b that each apply a current control integral gain KI, integrators 23a and 23b, and adders 24a and 24b.

It is to be noted that details of functions and operation of the current controller 16 are described in the prior invention and thus are omitted here.

Figure 4:
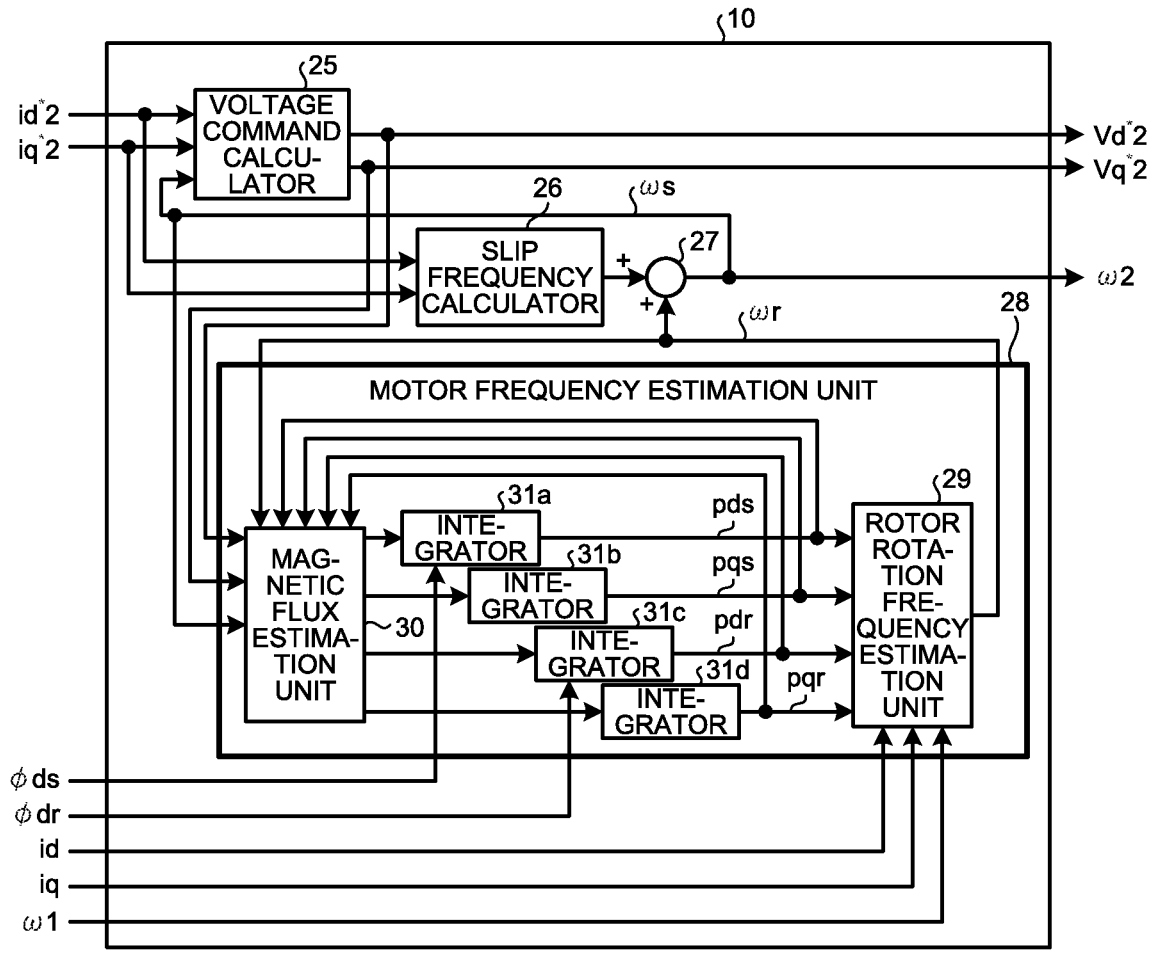
FIG. 4 is a block diagram illustrating a configuration example of a second calculation unit illustrated in FIG. 1.

FIG. 4 is a block diagram showing a configuration example of the second calculation unit 10 illustrated in FIG. 1. As illustrated in FIGS. 1 and 4, the second calculation unit 10 receives, as inputs, the d-axis and q-axis current commands id*2 and iq*2 generated by the current command unit 11, the d-axis and q-axis currents id and iq converted by the three-phase/dq converter 5, and those that are calculated by the first calculation unit 9 and include the first angular frequency ω1, the primary d-axis magnetic flux Os, and the secondary d-axis magnetic flux φdr. The second calculation unit 10 is the component that calculates a d-axis voltage command Vd*2, a q-axis voltage command Vq*2, and a second speed that is a driving speed of the induction machine 1.

It is to be noted here that the driving speed of the induction machine 1 is synonymous with an angular frequency of the alternating-current voltage that the power converter 2 applies to the induction machine 1, although a unit representing its physical quantity is different. As such, the second speed, which is the driving speed of the induction machine 1, is referred to as "second angular frequency", and this second angular frequency is represented by "ω2".

As illustrated in FIG. 4, the second calculation unit 10 includes a voltage command calculator 25, a slip frequency calculator 26, an adder 27, a motor frequency estimation unit 28, a rotor rotation frequency estimation unit 29, a magnetic flux estimation unit 30, and integrators 31a, 31b, 31c, and 31d.

It is to be noted that details of functions and operation of the second calculation unit 10 are described in the prior invention and thus are omitted here.

Figure 5:
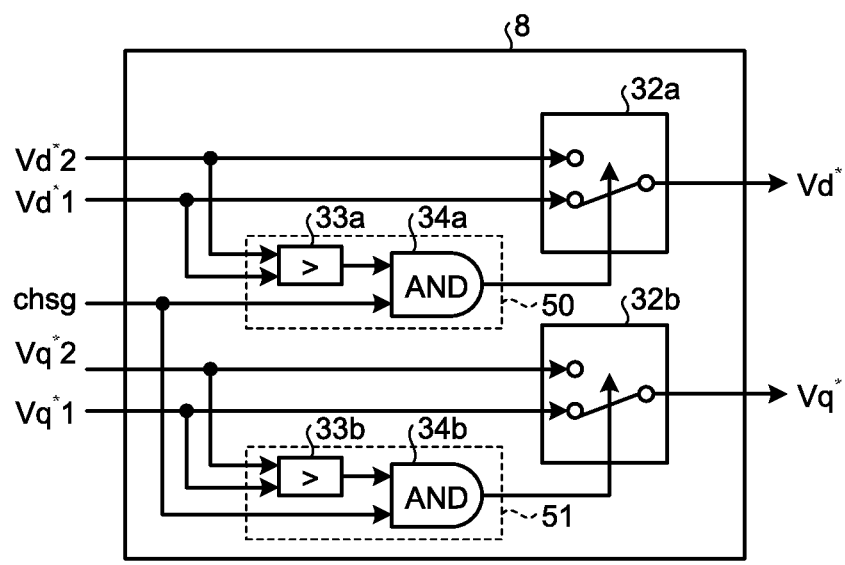
FIG. 5 is a block diagram illustrating a configuration example of a voltage command switching unit illustrated in FIG. 1.

FIG. 5 is a block diagram illustrating a configuration example of the voltage command switching unit 8 illustrated in FIG. 1. As illustrated in FIGS. 1 and 5, the voltage command switching unit 8 receives, as inputs, the d-axis and q-axis voltage commands Vd*1 and Vq*1 calculated by the first calculation unit 9, the d-axis and q-axis voltage commands Vd*2 and Vq*2 calculated by the second calculation unit 10, and the control mode signal chsg coming from the control switching unit 12. The voltage command switching unit 8 is the component that changes its outputs for the dq/the three-phase converter 4 from the d-axis and q-axis voltage commands Vd*1 and Vq*1 to the d-axis and q-axis voltage commands Vd*2 and Vq*2 when the control mode signal chsg switches over from a control mode 1 to a control mode 2. The voltage command switching unit 8 includes, as illustrated in FIG. 5, switching units 32a and 32b, a first voltage command switching determination unit 50 that includes a comparator 33a and a logical conjunction unit 34a, and a second voltage command switching determination unit 51 that includes a comparator 33b and a logical conjunction unit 34b.

It is to be noted that details of functions and operation of the voltage command switching unit 8 are described in the prior invention and thus are omitted here.

Figure 6:
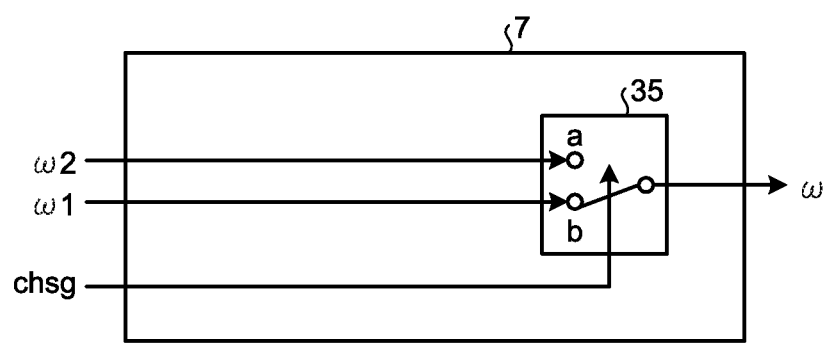
FIG. 6 is a block diagram illustrating a configuration example of a speed switching unit illustrated in FIG. 1.

FIG. 6 is a block diagram illustrating a configuration example of the speed switching unit 7 illustrated in FIG. 1. The speed switching unit 7 includes a switching unit 35. The speed switching unit 7 receives, as inputs, the first angular frequency ω1 calculated by the first calculation unit 9, the second angular frequency ω2 calculated by the second calculation unit 10, and the control mode signal chsg coming from the control switching unit 12. When the control mode signal chsg switches over from the control mode 1 to the control mode 2, the switching unit 35 switches over from a contact b to a contact a, whereby the speed switching unit 7 has its output for the phase calculator 6 changed from the first angular frequency ω1 calculated by the first calculation unit 9 to the second angular frequency ω2 calculated by the second calculation unit 10. In this way, the output is changed smoothly from the first angular frequency ω1 to the second angular frequency ω2.

Figure 7:
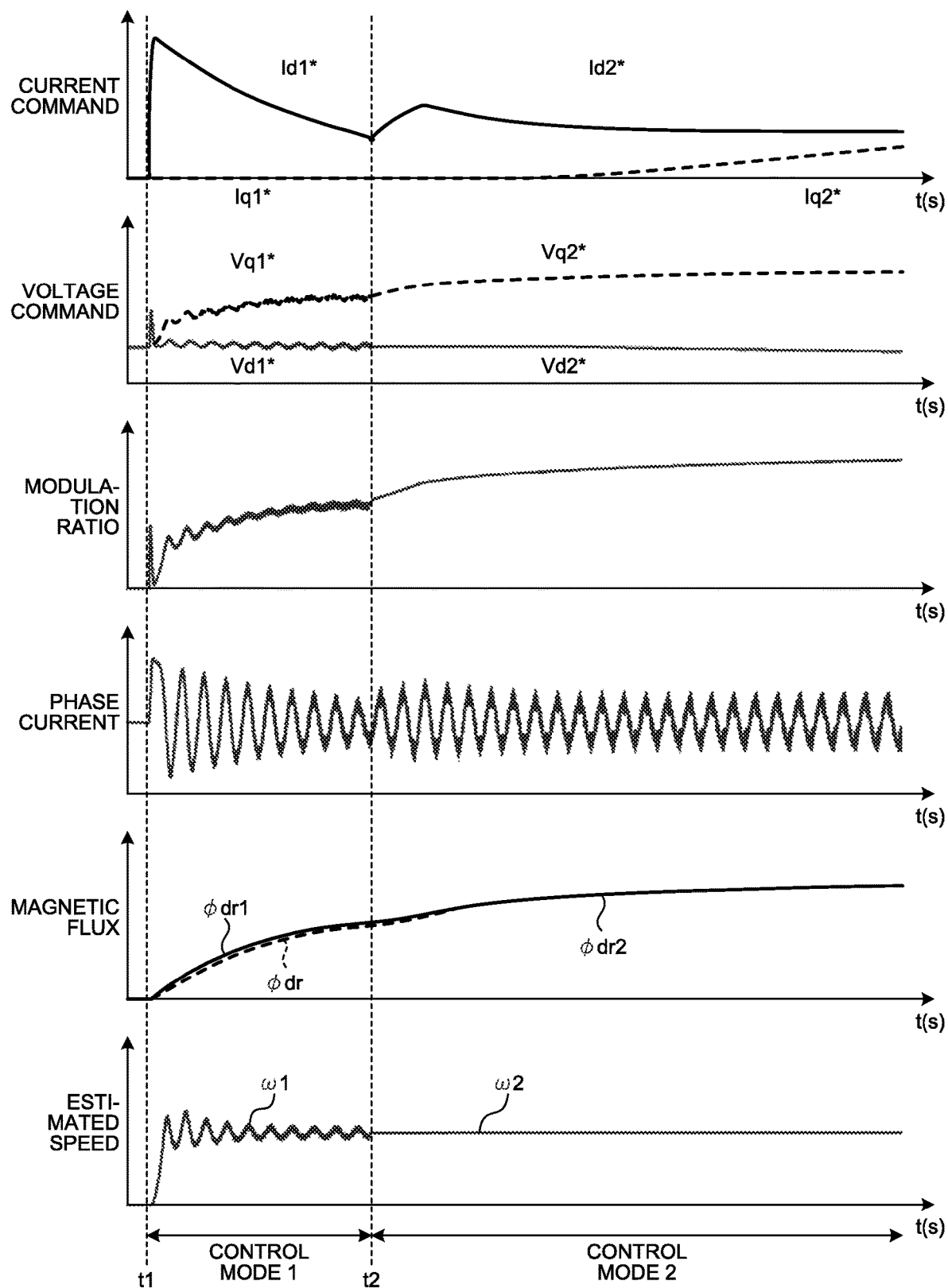
FIG. 7 is a time chart illustrating operating wave profiles according to a conventional technique when there is no residual magnetic flux in an induction machine.
Figure 8:
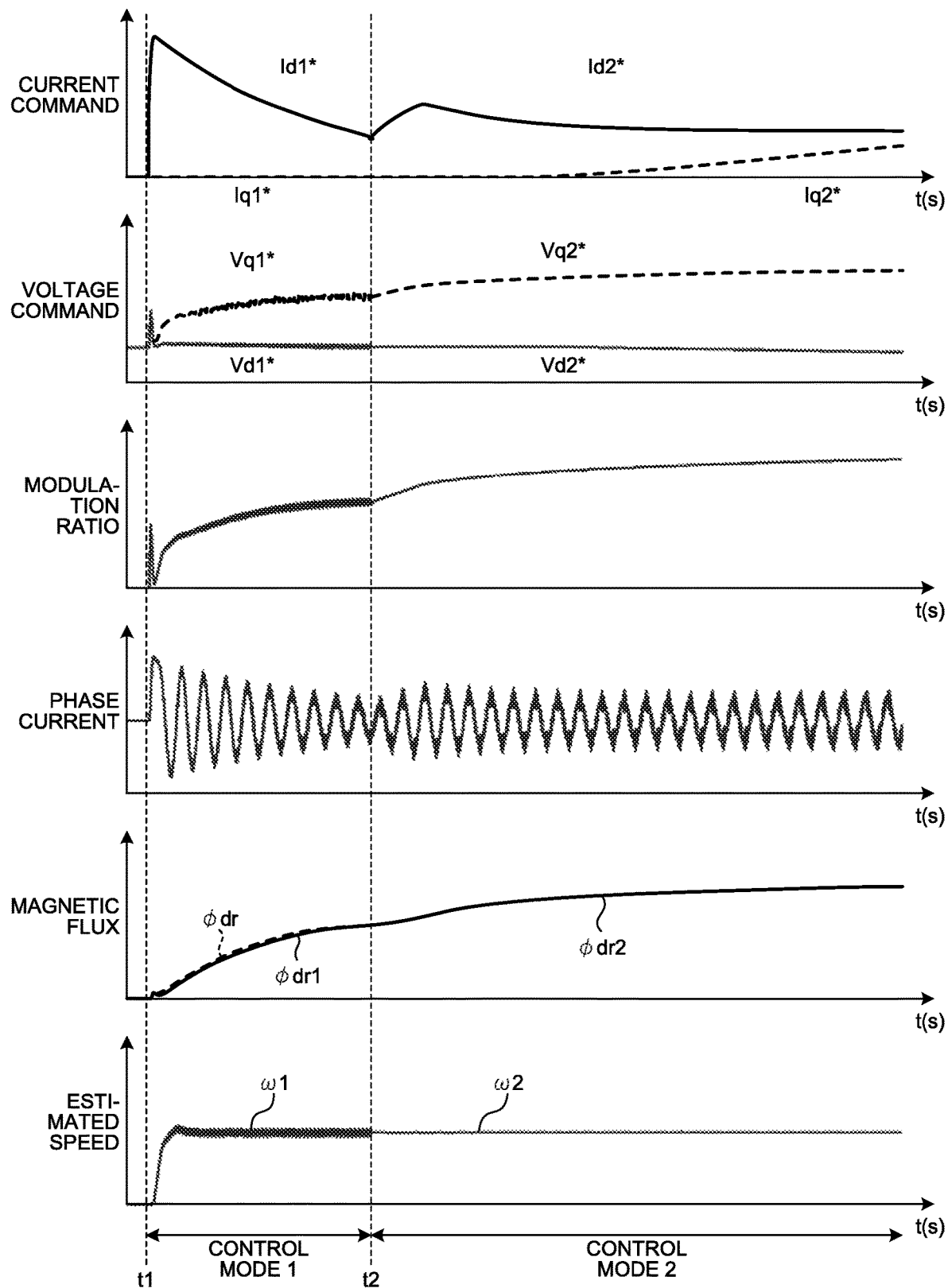
FIG. 8 is a time chart illustrating operating wave profiles according to the present invention when there is no residual magnetic flux in an induction machine.
Figure 9:
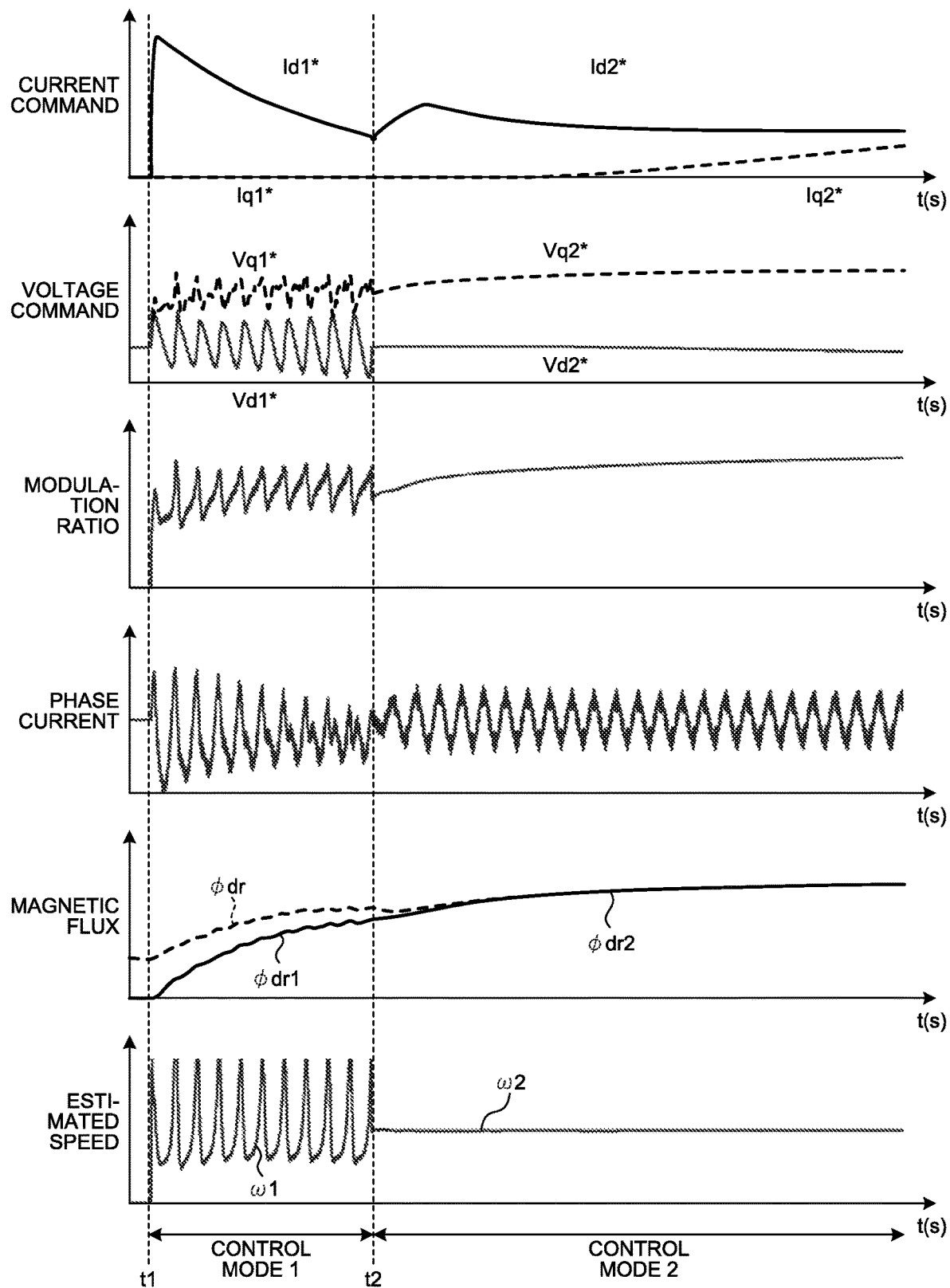
FIG. 9 is a time chart illustrating operating wave profiles according to the conventional technique when there is a residual magnetic flux in the induction machine.
Figure 10:
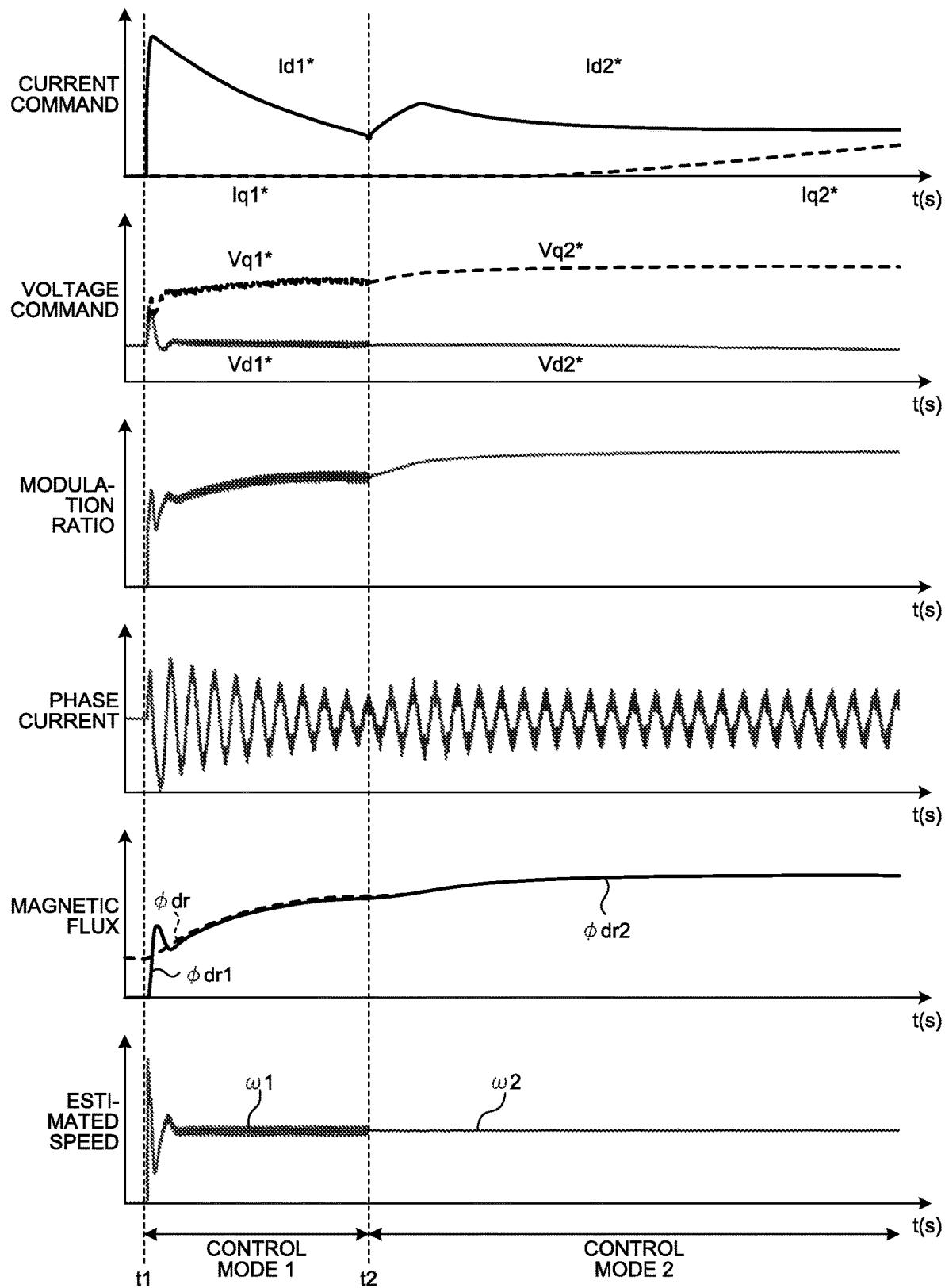
FIG. 10 is a time chart illustrating operating wave profiles according to the present invention when there is a residual magnetic flux in the induction machine.

With reference to FIGS. 7 to 10, a description is provided of effects achieved when the above-stated control method according the present invention is applied. FIG. 7 is a time chart illustrating operating wave profiles according to the conventional technique when there is no residual magnetic flux in the induction machine. FIG. 8 is a time chart illustrating operating wave profiles according to the present invention when there is no residual magnetic flux in the induction machine. FIG. 9 is a time chart illustrating operating wave profiles according to the conventional technique when there is a residual magnetic flux in the induction machine. FIG. 10 is a time chart illustrating operating wave profiles according to the present invention when there is a residual magnetic flux in the induction machine.

In each of FIGS. 7 to 10, horizontal axes each represent time, and vertical axes represent wave profiles that belong to the current commands, the voltage commands, a modulation ratio, phase current, the magnetic flux, and the angular frequency, which is the estimated speed, when named in order from the top. FIGS. 7 to 10 all illustrate the operating wave profiles with a time point t1 being when the control mode 1 signal is output to initiate the f search and with a time point t2 being when a switchover to the control mode 2 signal takes place. In each wave profile section for the magnetic flux, Or represents the residual magnetic flux. What the other symbols represent are just as described in the present embodiment.

As can be understood from comparison between FIGS. 7 and 8, when there is no residual magnetic flux in the induction machine, the voltage commands, the modulation ratio, and the angular frequency each experience minor variations in the present invention. However, even in the conventional technique, angular frequency switching is smooth, and stability of initial speed estimation is secured.

In contrast to this, the FIG. 9 operating wave profiles according to the conventional technique show that in the presence of the residual magnetic flux in the induction machine, residual magnetic flux estimation brings about significant errors, and the angular frequency, which is the estimated speed, and the voltage commands change unstably.

On the other hand, the FIG. 10 operating wave profiles according to the present invention show that the residual magnetic flux estimation has minor errors, and the angular frequency, which is the estimated speed, and the voltage commands change stably.

According to the electric vehicle propulsion control device of the present embodiment described above, the d-axis voltage command and the q-axis voltage command for the power converter, and the primary magnetic flux and the secondary magnetic flux of the induction machine are calculated from the current information detected at the induction machine and the current command values that are based on the operation command. The interference term stemming from the d-axis voltage command is added to or subtracted from the term including the q-axis voltage command in calculation of the first speed that is the free-run speed of the induction machine. As such, improved stability of the initial speed estimation is enabled in speed-sensorless control.

According to the electric vehicle propulsion control device of the present embodiment, the current information detected at the induction machine is converted into the d-axis current and the q-axis current that are current values of the dq coordinate system. The q-axis current is converted into the q-axis-voltage-command physical quantity by application of, in addition to the first gain corresponding to the primary resistance of the induction machine, the gain corresponding to the value obtained by division of the product of the square of the mutual inductance of the induction machine and the secondary resistance of the induction machine by the square of the secondary inductance of the induction machine to the q-axis current, and the q-axis-voltage-command physical quantity is added to or subtracted from the q-axis voltage command. As such, enhanced accuracy and improved stability of the initial speed estimation are enabled.

Figure 11:
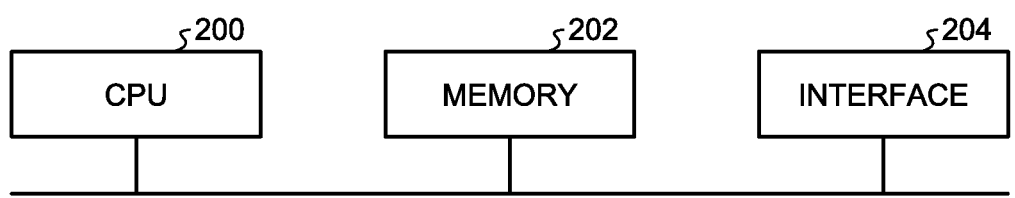
FIG. 11 is a block diagram illustrating an example of a hardware configuration that embodies functions of the first and second calculation units according to the present embodiment.
Figure 12:
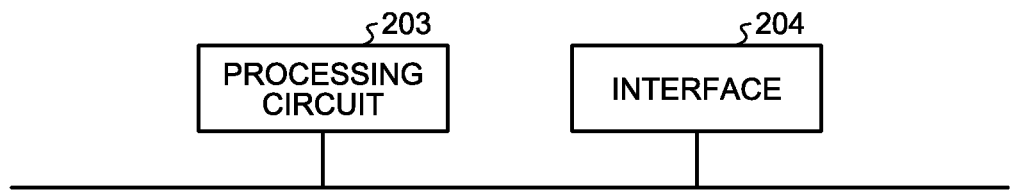
FIG. 12 is a block diagram illustrating another example of the hardware configuration that embodies the functions of the first and second calculation units according to the present embodiment.

Lastly, with reference to each of FIGS. 11 and 12, a description is provided of a hardware configuration that implements all or some of the functions of the first and second calculation units 9 and 10 according to the present embodiment. FIG. 11 is a block diagram illustrating an example of the hardware configuration that embodies the functions of the first and second calculation units 9 and 10 according to the present embodiment. FIG. 12 is a block diagram illustrating another example of the hardware configuration that embodies the functions of the first and second calculation units 9 and 10 according to the present embodiment.

For implementation of all or some of the functions of the above-mentioned first and second calculation units 9 and 10, the configuration can be to include, as illustrated in FIG. 11, a central processing unit (CPU) 200 that makes calculations, a memory 202 that stores programs to be read by the CPU 200, and an interface 204 that inputs and outputs signals. It is to be noted that the CPU 200 may be a calculation unit such as a microprocessor, a microcomputer, a processor, or a digital signal processor (DSP). The memory 202 corresponds to a nonvolatile or volatile semiconductor memory such as a random access memory (RAM), a read only memory (ROM), a flash memory, an erasable programmable ROM (EPROM), or an electrically EPROM (EEPROM).

The memory 202 specifically stores the programs according to which all or some of the functions of the first and second calculation units 9 and 10 are implemented. While transmitting and receiving necessary information via the interface 204, the CPU 200 implements calculations of the first and second calculation units 9 and 10 described in the present embodiment.

It is to be noted that the CPU 200 and the memory 202 that are illustrated in FIG. 11 may be replaced by a processing circuit 203 as illustrated in FIG. 12. The processing circuit 203 corresponds to, for example, a single circuit, a composite circuit, a programmed processor, a parallel programmed processor, an application specific integrated circuit (ASIC), a field-programmable gate array (FPGA), or a combination of these.

The above configurations illustrated in the embodiment are illustrative of contents of the present invention, can be combined with other techniques that are publicly known and can be partly omitted or changed without departing from the gist of the present invention.

REFERENCE SIGNS LIST 1 induction machine; 2 power converter; 3a, 3b, 3c current detector; 4 dq/three-phase converter; 5 three-phase/dq converter; 6 phase calculator; 7 speed switching unit; 8 voltage command switching unit; 9 first calculation unit; 10 second calculation unit; 11 current command unit; 12 control switching unit; 13 secondary d-axis magnetic flux calculator; 14a, 14b, 24a, 24b, 27 adder; 14c, 19a, 19b subtracter; 14d, 21a, 21b, 22a, 22b multiplier; 14e divider; 15 sign extractor; 16 current controller; 17a, 17b gain application unit; 18, 23a, 23b, 31a, 31b, 31c, 31d integrator; 20a, 20b switching unit; 25 voltage command calculator; 26 slip frequency calculator; 28 motor frequency estimation unit; 29 rotor rotation frequency estimation unit; 30 magnetic flux estimation unit; 32a, 32b, 35 switching unit; 33a, 33b comparator; 34a, 34b logical conjunction unit; 50 first voltage command switching determination unit; 51 second voltage command switching determination unit; 60 controller; 100 electric vehicle propulsion control device.

The invention claimed is:

1. An electric vehicle propulsion control device comprising:
a power converter to apply an alternating-current voltage to an induction machine mounted to an electric vehicle; and a controller to control the power converter based on an external operation command,
wherein the controller includes:
a first calculation circuitry to:
calculate, from current information detected at the induction machine and current command values that are based on the external operation command, a d-axis voltage command and a q-axis voltage command for the power converter, and a primary magnetic flux and a secondary magnetic flux of the induction machine, and calculate a first speed that is a free-run speed of the induction machine by adding to or subtracting from a term including the q-axis voltage command an interference term stemming from the d-axis voltage command, and by adding, to the term including the q-axis voltage command, a term resulting from multiplying a multiplier coefficient by a d-axis current; and a second calculation circuitry to:

use, as initial values, the first speed, the primary magnetic flux, and the secondary magnetic flux that are output from the first calculation circuitry and to calculate second voltage command values for the power converter, and a second speed that is a driving speed of the induction machine.

2. The electric vehicle propulsion control device according to claim 1, wherein, the current information is converted into the d-axis current and a q-axis current that are current values of a dq coordinate system, the first calculation circuitry converts the q-axis current into a q-axis-voltage-command physical quantity by applying to the q-axis current a first gain corresponding to a primary resistance of the induction machine and adds to or subtracts from the q-axis voltage command the q-axis-voltage-command physical quantity.

3. The electric vehicle propulsion control device according to claim 2, wherein the first calculation circuitry converts the q-axis current into a q-axis-voltage-command physical quantity by applying, in addition to the first gain, a gain corresponding to a value obtained by dividing a product of a square of a mutual inductance of the induction machine and a secondary resistance of the induction machine by a square of a secondary inductance of the induction machine to the q-axis current and adds to or subtracts from the q-axis voltage command the q-axis-voltage-command physical quantity.

4. The electric vehicle propulsion control device according to claim 2, wherein the first calculation circuitry calculates the secondary magnetic flux based on the primary magnetic flux and the d-axis current.

5. The electric vehicle propulsion control device according to claim 1, wherein, the current information is converted into the d-axis current and a q-axis current that are current values of a dq coordinate system, the first calculation circuitry converts the q-axis current into a q-axis-voltage-command physical quantity by applying to the q-axis current a first gain corresponding to a primary resistance of the induction machine and adds to or subtracts from the q-axis voltage command the q-axis-voltage-command physical quantity.

6. The electric vehicle propulsion control device according to claim 5, wherein the first calculation circuitry converts the q-axis current into a q-axis-voltage-command physical quantity by applying, in addition to the first gain, a gain corresponding to a value obtained by dividing a product of a square of a mutual inductance of the induction machine and a secondary resistance of the induction machine by a square of a secondary inductance of the induction machine to the q-axis current and adds to or subtracts from the q-axis voltage command the q-axis-voltage-command physical quantity.

7. The electric vehicle propulsion control device according to claim 5, wherein the first calculation circuitry calculates the secondary magnetic flux based on the primary magnetic flux and the d-axis current.

8. The electric vehicle propulsion control device according to claim 3, wherein the first calculation circuitry calculates the secondary magnetic flux based on the primary magnetic flux and the d-axis current.

9. The electric vehicle propulsion control device according to claim 6, wherein the first calculation circuitry calculates the secondary magnetic flux based on the primary magnetic flux and the d-axis current.

* * * * *